Oct. 13, 1964 W. G. EINTHOVEN ETAL 3,152,373

METHOD OF MANUFACTURING SEMICONDUCTOR DEVICES

Filed Nov. 14, 1961

INVENTORS
WILLEM G. EINTHOVEN &
JAN A. MANINTVELD
BY
Frank R. Jifari
AGENT 3,152,373

METHOD OF MANUFACTURING SEMICONDUCTOR DEVICES

Willem Gerard Einthoven and Jan Adrianus Manintveld, both of Nijmegen, Netherlands, assignors to North American Philips Company, Inc., New York, N.Y., a corporation of Delaware Filed Nov. 14, 1961, Ser. No. 152,322
Claims priority, application Netherlands Nov. 21, 1960
4 Claims. (Cl. 22—204)

The invention relates to a method of manufacturing semiconductor devices, for example transistors and crystal diodes, in which a semiconductor body and a supply of electrode material are separately heated to a temperature higher than the melting point of the electrode material but lower than the melting point of the body, the electrode material subsequently being thrown or cast on to the body and united thereto. This may be effected in a simple manner by arranging the body and the electrode material in receptacles of a jig, which are connected to one another by at least one duct, and subsequently tilting the jig so that the molten electrode material falls on to the body. However, the invention is not limited to this method of throwing. The semiconductor body may consist of germanium or silicon.

To ensure satisfactory uniform adhesion between the semiconductor body and the electrode material thrown thereon, it is desirable that this material should have a certain kinetic energy at the instant of contact. It has already been proposed to increase this kinetic energy by providing a displaceable weight on the electrode material in the jig. This method has a limitation in that the manufacture of a jig containing a displaceable weight may give rise to technical difficulties.

It is an object of the invention to provide means to increase the kinetic energy in a simple manner.

The invention is based on the idea of increasing the amount and in particular the weight of the incident electrode material without the amount of material ultimately left on the semiconductor body being abnormally large. If the said amount should be abnormally large, mechanical stresses are likely to occur at the circumference of, and under the electrode. These stresses spoil the electrical properties of the device and may lead to the breaking off of the electrode.

According to the invention, there is thrown on to the semiconductor body an amount of the electrode material consisting of at least 25% by weight of one or more elements the vapor pressure of which at a certain temperature is at least as large as that of lead, the whole then being heated to a temperature for a time such that at least 25% by weight of the material initially thrown on is vaporized, the remaining material, which is at most 75% by weight of the material thrown on the body, being cooled down to room temperature. The remaining material forms an alloyed electrode on the body and thus usually combines a carrier metal such as tin, lead, indium, bismuth or gold and one or more active impurities such as gallium, aluminum, arsenic or antimony.

Since, as has been described hereinbefore, it is of particular importance that the weight of the incident electrode material should be increased without the resulting electrode having abnormal size, in a further embodiment of the invention elements are preferably added which have not only a high vapor pressure but also a high specific weight, particularly the elements lead, bismuth and thallium. Such elements may be used separately or in combination.

The temperature at which the vapor pressures of the elements used have to be compared to the vapor pressure of lead, is not critical, because these vapor pressures have the same ratio through a large temperature range, as will seen from the graph discussed hereinafter. Obviously, the most suitable temperature for making comparisons is the temperature at which the material is vaporized.

Obviously, only those elements should be added which, under the relevant circumstances, do not exert a detrimental influence on the activity of the other elements present in the electrode material, especially the acceptors and/or donors normally contained therein, or on the semiconductor body.

In order that the invention may be readily carried out, an embodiment thereof will now be described, by way of example, with reference to the accompanying drawing, in which.

Figure 1:
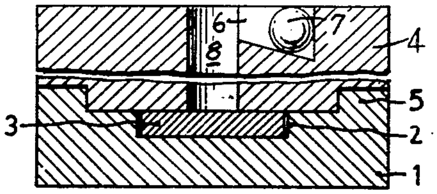
FIGURE 1 is a diagrammatic cross-sectional view of a known jig for throwing electrodes on to a semiconductor body and fusing them thereto, which latter process is also referred to as alloying.

In FIGURE 1, a jig comprises a lower half including a receptacle 2 for a semiconductor body 3, and an upper half 4 centered with respect to the lower half by a cooperating fitting edge 5. The upper half contains a receptacle 6 for a supply of electrode material 7, and this receptacle 6 is connected to the receptacle 2 for the semiconductor body by a duct 8 having a diameter of 2.5 mm. The jig may be made of graphite.

Such a jig may be multiple, that is to say, it may be designed for the treatment of several semiconductor bodies, and several electrodes may be alloyed to one body. For the sake of clarity, the provision of a single electrode will be described.

The semiconductor body may consist of n-type silicon having a resistivity of 10 ohm-cm. The electrode material used is an alloy comprising

| | Percent by weight |
|---|---|
| Lead | 89.75 |
| Tin | 5.0 |
| Antimony | 5.0 |
| Gallium | 0.25 |

Figure 3:
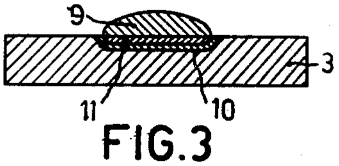
FIGURES 2 and 3 show the cross-sectional outlines of an electrode immediately after the electrode material has been thrown on and after subsequent heat treatment, respectively.
Figure 2:
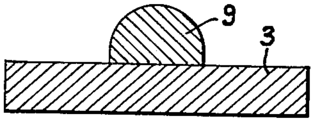

About 100 mg. of this alloy are introduced into the receptacle 6, after which the jug is heated in a hydrogen atmosphere to about 1000° C. and subsequently tilted to the left through a small angle, so that the molten electrode material 7 flows into the duct 8 and drops on to the silicon surface, which is purified by the heat treatment in the reducing hydrogen atmosphere. Thus, an electrode 9 is produced having a comparatively high cross-sectional outline, as is shown diagrammatically in FIGURE 2. Then the temperature is raised to 1100° C. and maintained at this value for 3 hours, about half of the lead initially present being vaporized so that the outline of the electrode 9 becomes much more level, as shown in FIGURE 3. The temperature at which the jig is tilted should be chosen not too high in order that active impurities which should be present in the alloy, such as antimony, should not vaporize prematurely.

After the incidence of the electrode material, a certain amount of semiconductor material is dissolved therein and subsequently after cooling, segregates further and grows to the original crystal lattice.

Thus, there are formed under this electrode a layer 10 of p-type silicon, which is produced by gallium diffusion, which is about 3 microns thick and adjoins the initial n-type silicon, and on top of this layer, a layer 11 of n-type silicon produced by segregation of silicon saturated with antimony, this latter layer being covered by the remaining electrode material. This layer is about 15 microns thick. Such n-n-n structures may be used in transistors and controlled rectifiers. It should be noted that, owing to the fact that the amount of incident electrode material, part of which subsequently vaporizes, is comparatively large, the amount of semiconductor material which is initially dissolved is also comparatively large, so that the segregated layer 11 may be comparatively thick. If an electrode material is used in which the semiconductor material dissolves poorly, the layer 11 remains comparatively thin.

Obviously, the invention is not limited to the manufacture of electrodes of the type described by way of example. Without departing from the principle of the invention, electrode material containing either acceptors only or donors only may be used, however, the material may be neutral so as to provide an ohmic contact both on n-type and on n-type semiconductor material.

Figure 4:
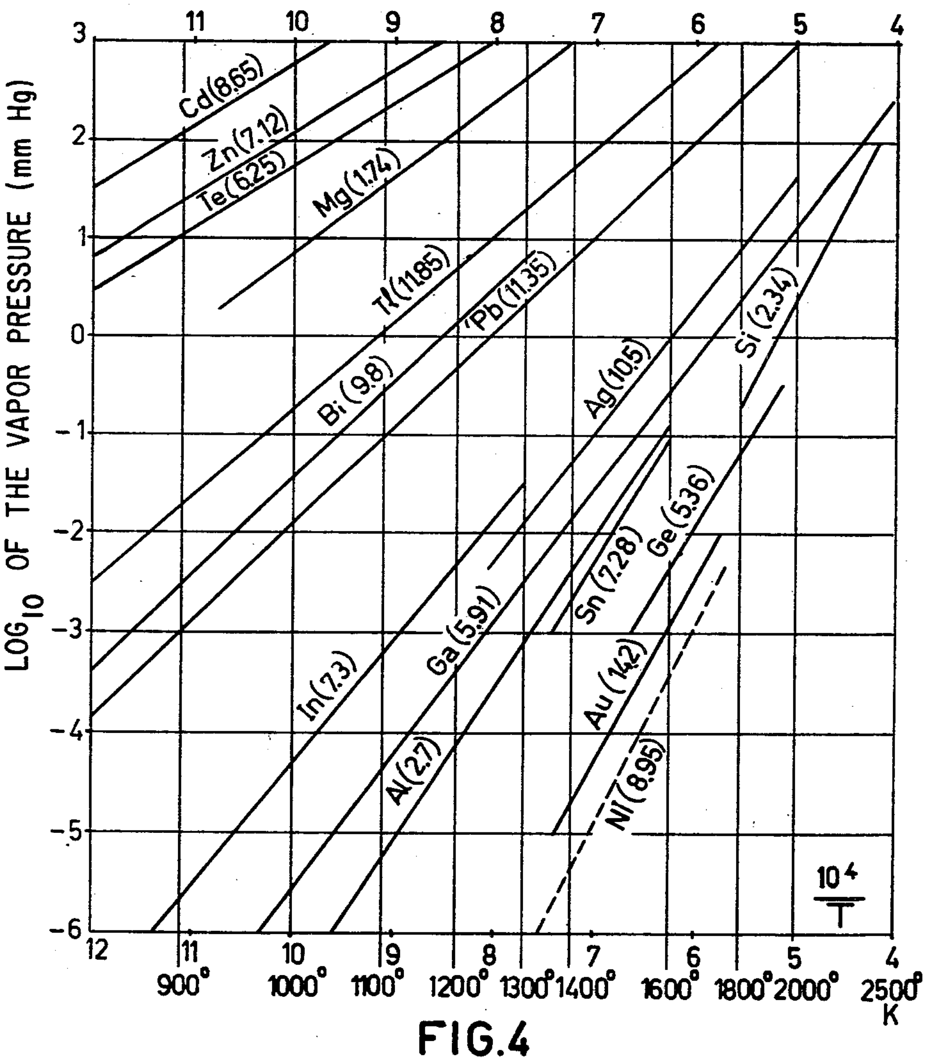
FIGURE 4 is a graph in which for a number of elements the logarithm to the base 10 of the vapor pressure in mm. of mercury pressure is plotted against the reciprocal times $10^4$ of the absolute temperature in the upper scale and against absolute temperature in ° K. in the lower scale.

With respect to the choice of the element which according to the invention is vaporized after being thrown on, the following is stated with reference to FIGURE 4. In this figure, the valve $10^4/T$, where T is the absolute temperature, are plotted as abscissae. The values of T are also given. The logarithms of the vapor pressure in mm. of mercury pressure are plotted as ordinates. For a number of elements, the lines showing the relationship between vapor pressure and temperature are drawn. The symbols of the elements and, between brackets, the numbers denoting their specific weights are written along these lines, which are approximately straight.

The figure shows that the elements indium, gallium, aluminum and tin, which are frequently used for producing alloy electrodes, have a comparatively low vapor pressure and also a comparatively low specific weight. Other elements having a relatively low vapor pressure are silver, silicon, germanium, gold and nickel.

The limit at the vapor pressure of lead, which limit was found as a criterion for the invention, is not completely explained by the fact that, at the usual alloying temperatures, the vapor pressure of this element is higher than that of indium by at least two powers of 10, although the latter element shows the highest vapor pressures among the group of elements referred to in the precednig paragraph. The choice is also explained by the fact that lead has a comparatively high specific weight. The same applies to the elements bismuth and thallium. Elements such as magnesium, tellurium, zinc and cadmium with respect to their vapor pressure are suited for use in the method according to the invention, however, these elements have other properties which make them less suitable. They might exert a detrimental influence on the elementary semiconductor; also, their specific wegiht is relatively low in comparison with lead.

What is claimed is:

1. In a method of manufacturing a semiconductor device in which a semiconductive body and a mass of electrode material while separated from each other are heated at a temperature sufficient to melt the electrode mass but insufficient to melt the body, after which the electrode melt is cast onto the body to alloy with a surface region thereof, and after which the assembly is cooled to freeze the mass and form an alloyed electrode on the body, the improvement comprising constituting the mass prior to its being cast of at least 25% by weight of at least one element having a high specific weight whose vapor pressure at a given temperature is at least substantially equal to that of lead at the same given temperautre, and, after the electrode has been cast onto the semiconductive body, heating the electrode at a temperature and for a period of time sufficient to remove from the mass by vaporization at least 25% by weight of the cast material, whereby the initially heavier cast electrode improves the alloying to the body and the lighter electrode resulting from the vaporization step lessens the risk of damage during cooling.

2. A method as set forth in claim 1 wherein the element is selected from the group consisting of lead, bismuth, and thallium.

3. In a method of manufacturing a semiconductor device in which a semiconductors body and a certain mass of electrode material while separated from each other are heated at a temperature sufficient to melt the electrode mass but insufficient to melt the body, after which the electrode melt is cast onto the body to alloy with a surface region thereof, and after which the assembly is cooled to freeze the mass and form a certain sized alloyed electrode on the body, the improvement comprising increasing the amount of the mass above that required to form the desired sized electrode prior to its being cast and constituting at least 25% by weight of the mass by at least one element having a high specific weight whose vapor pressure at a given temperature is at least substantially equal to that of lead at the same given temperature, and, after the oversized electrode melt has been cast onto the semiconductive body and before it has been cooled, heating the electrode at a temperature and for a period of time sufficient to remove from the mass by vaporization at least 25% by weight of the cast material to form the desired electrode size, whereby the initially heavier cast electrode improves the alloying to the body and the lighter electrode resulting from the vaporization step lessens the rick of damage during cooling.

4. A method as set forth in claim 3 wherein said element is selected from the group consisting of lead, bismuth, and thallium.

References Cited by the Examiner

UNITED STATES PATENTS

| | | | |
|---|---|---|---|
| 2,842,831 | 7/58 | Pfann | 29—25.3 |
| 2,857,296 | 10/58 | Farris | 148—1.5 |

FOREIGN PATENTS

| | | |
|---|---|---|
| 1,224,318 | 2/60 | France. |

OTHER REFERENCES

Handbook of Chemistry and Physics, 39th ed., Cleveland, Ohio, Chemical Rubber Publishing Co., 1957–1958, p. 2155–2170.

Germany, addition S 40 3 VIII c/21 g, PA 54/2,468, 7/56.

UNITED STATES PATENT OFFICE

CERTIFICATE OF CORRECTION

Patent No. 3,152,373 October 13, 1964

Willem Gerard Einthoven et al.

It is hereby certified that error appears in the above numbered patent requiring correction and that the said Letters Patent should read as corrected below.

Column 2, line 1, after "will" insert -- be --; line 51, for "jug" read -- jig --; column 3, line 7, for "n-n-n" read -- n-p-n --; line 22, for "n-" read -- p- --; line 27, for "valve" read -- values --; same column 3, line 49, for "precednig" read -- preceding --; column 4, line 22, for "semiconductors" read -- semiconductive --; line 44, for "rick" read -- risk --.

Signed and sealed this 23rd day of February 1965.

SEAL)
Attest:

ERNEST W. SWIDER
Attesting Officer

EDWARD J. BRENNER
Commissioner of Patents